United States Patent [19]

Chism

[11] Patent Number: 5,003,554

[45] Date of Patent: Mar. 26, 1991

[54] APPARATUS FOR THE AUTOMATIC IN-CIRCUIT TESTING OF CODER/DECODER TELECOMMUNICATIONS CIRCUITS AND METHOD THEREFOR

[75] Inventor: Wayne R. Chism, Greeley, Colo.

[73] Assignee: Hewlett-Packard Company, Palo Alto, Calif.

[21] Appl. No.: 221,066

[22] Filed: Jul. 19, 1988

[51] Int. Cl.⁵ .................................. H04B 3/46
[52] U.S. Cl. .................................. 375/10; 324/73.1; 371/25.1
[58] Field of Search ............... 375/8, 10; 370/13, 14, 370/15, 16; 379/21, 22, 31; 455/115; 324/78 R, 73.1; 364/486, 487; 371/22.5, 24, 26, 25.1

[56] References Cited

U.S. PATENT DOCUMENTS

| | | | |
|---|---|---|---|
| 4,347,600 | 8/1982 | Abbott et al. | 370/13 |
| 4,414,632 | 11/1983 | Murrell | 455/115 |
| 4,580,274 | 4/1986 | Debany, Jr. et al. | 375/10 |
| 4,777,645 | 10/1988 | Faith et al. | 375/10 |

Primary Examiner—Douglas W. Olms
Assistant Examiner—Stephen Chin

[57] ABSTRACT

An automated apparatus and method for in-circuit testing of a coder/decoder circuit mounted a telecommunications card. The automated apparatus is capable of testing the functioning of the coder/decoder circuit: by applying at least one analog voltage signal to the transmit pin and recording the resulting digital serial output signals and by applying at least one pattern of digital signals to the digital serial input pin and recording the resulting analog signals on the receive pin. In conducting these tests, the automated apparatus electrically overdrives any analog or digital signal from associated components on the circuitry.

11 Claims, 7 Drawing Sheets

APPARATUS FOR THE AUTOMATIC IN-CIRCUIT TESTING OF CODER/DECODER TELECOMMUNICATIONS CIRCUITS AND METHOD THEREFOR

RELATED APPLICATIONS

This application is related to:
1. Programmatically Generated In-Circuit Test for General Purpose Operational Amplifiers, Ser. No. 175,831, Filed Mar. 31, 1988;
2. programmatically Generated In-Circuit Test of Analog to Digital Converters, Ser. No. 175,874, Filed Mar. 31, 1988;
3. Programmatically Generated In-Circuit Test of Digital to Analog Converters, Ser. No. 175,713, Filed Mar. 31, 1988; and
4. Apparatus for the Automatic In-Circuit Testing of Subscriber Line Interface Circuits and, Method Therefor; inventor: Wayne R. Chism Pat. No. 4,860,332; filed July 19, 1988.

FIELD OF THE INVENTION

This invention relates to the in-circuit functionality testing of hybrid circuit components, i.e., those having both analog and digital components and input/output ports; and, in particular, to an apparatus and method for the automatic in-circuit testing of telecommunication coder/decoder circuits.

STATEMENT OF THE PROBLEM

A COder/DECoder (CODEC) circuit finds application in the telecommunications industry for interfacing analog instruments such as telephones, FSK modems, fax machines and the like to digital Pulse Code Modulated (PCM) transmission networks. The term CODEC refers to a class of integrated circuits that perform the following functions. On the transmit side, the CODEC converts an incoming analog signal to a digital bit stream for encoding onto the multi-channel PCM transmission network. On the receive side, the CODEC decodes an incoming PCM bit stream and reconstructs the analog information present. Both conversions must obey the strict architectural definition of the PCM back plane and utilize specified companding algorithms defined in the telecommunications industry "Compand" is derived from compress/expand and refers to the use of nonlinear transfer functions between the CODEC input and output design to increase the effective dynamic range of the channel. Depending upon geographical location, two companding laws are in common use. These are termed the A-law and mu-law companding curves. In addition, CODEC integrated circuits often include on-board filters which perform band path anti-aliasing filtering on the transmit channel and low path filtering on the receive channel.

With the deregulation of the phone industry, numerous CODEC circuits are available from a variety of manufacturers. All of these circuits vary in design and degree in the composition of the hybrid circuit components, i.e., integrated circuits incorporating both analog and digital functions found in the CODEC design. All CODECs, however, regardless of the manufacturer, must perform according to strict standards as defined at the input and output ports.

The proliferation of these "hybrid" electronic components, has rendered standard fault detection techniques obsolete, and has created manufacturing and quality control problems for printed circuit board assemblies utilizing these devices in-circuit. A CODEC circuit generally comprises only a component of an overall telecommunications card. While the card may be functionally tested at the inputs and outputs of the card, an "in-circuit test" may be desirable as a means by which to identify specific CODEC problems independently of other circuitry on the card. The incircuit test is thus a manufacturing diagnostics tool aimed at reducing the overall manufacturing cost of the card.

Under the teachings of the present invention, incircuit tests or measurements refers to circuit board test procedures which, through the use of various isolation techniques, perform "pin checks" and "gross functionality tests" on an individual circuit regardless of the specific circuit configuration or the effects of the surrounding components. "Pin checks" are tests specifically designed to verify appropriate electrical activity on all device pins (i.e. the physical connections on the card to the specific CODEC circuit). "Gross functionality tests" are more comprehensive than pin checks and refer to tests designed to verify the basic function of the CODEC in addition to simply verifying pin activity. It is to be expressly understood that neither the pin check test nor the gross functionality test provides for a full functionality test of the CODEC circuit specification.

It is a problem in the field of in-circuit functionality testing of hybrid CODEC circuits to automatically test the circuit when resident on a card and interconnected with other associated telecommunication components. In practice, neither conventional analog or conventional digital discrete in-circuit test techniques, alone, will suffice as a means of performing a comprehensive in-circuit functionality test of analog and digital hybrid CODECS. Hence, printed circuit board assemblies incorporating CODECs have been difficult to test. As a result, telecommunication cards may incorporate defective CODEC circuits which are detected only much later in the manufacturing process. To detect and correct such a defective CODEC at that time is considerably more expensive and inconvenient.

Therefore, a need exists to provide a fully automated and high speed test apparatus capable of conducting pin checks and gross functionality tests on "in-circuit" CODECs.

SOLUTION TO THE PROBLEM

The above described problem is solved and a technical advance achieved in the field by the programmatically generated in-circuit test apparatus and method of the present invention for coder/decoder circuits. The present invention is an automated apparatus and method for in-circuit testing of the coder/decoder circuit mounted on a telecommunications card. The coder/decoder circuit is interconnected with other associated components on the card. The coder/decoder has transmit and receive pins, serial-in and serial-out pins, and frame, power-down and clock pins.

The automated apparatus of the present invention connects to the digital serial-in pin and the frame, power-down and clock pins, during a first test, for applying at least one digital signal pattern to the serial-in pin and then recording the resulting analog receive signal present on the receive pin.

The apparatus then connects to the transmit and serial-out pins and to the frame, power-down, and clock pins, during a second test, for applying at least one analog AC voltage signal to the transmit pin and then recording the resulting pattern of digital signals on the serial-out pin. In order to apply the at least one analog or digital signals, the apparatus of the present invention must electrically override any analog signal present on the transmit pin and any digital signal on the serial in pin. Likewise, any digital signals on the clock, power down, and frame pins must be digitally overdriven.

During a third test, the apparatus of the present invention connects to the power down pin and records the current consumption into the circuit when powered down. The detected signals are then compared to expected results and if any comparison falls outside of a determined range, the CODEC fails. Otherwise the CODEC passes and the apparatus of the present invention releases all relays and becomes ready for the next testing procedure.

DETAILED DESCRIPTION

Figure 1:
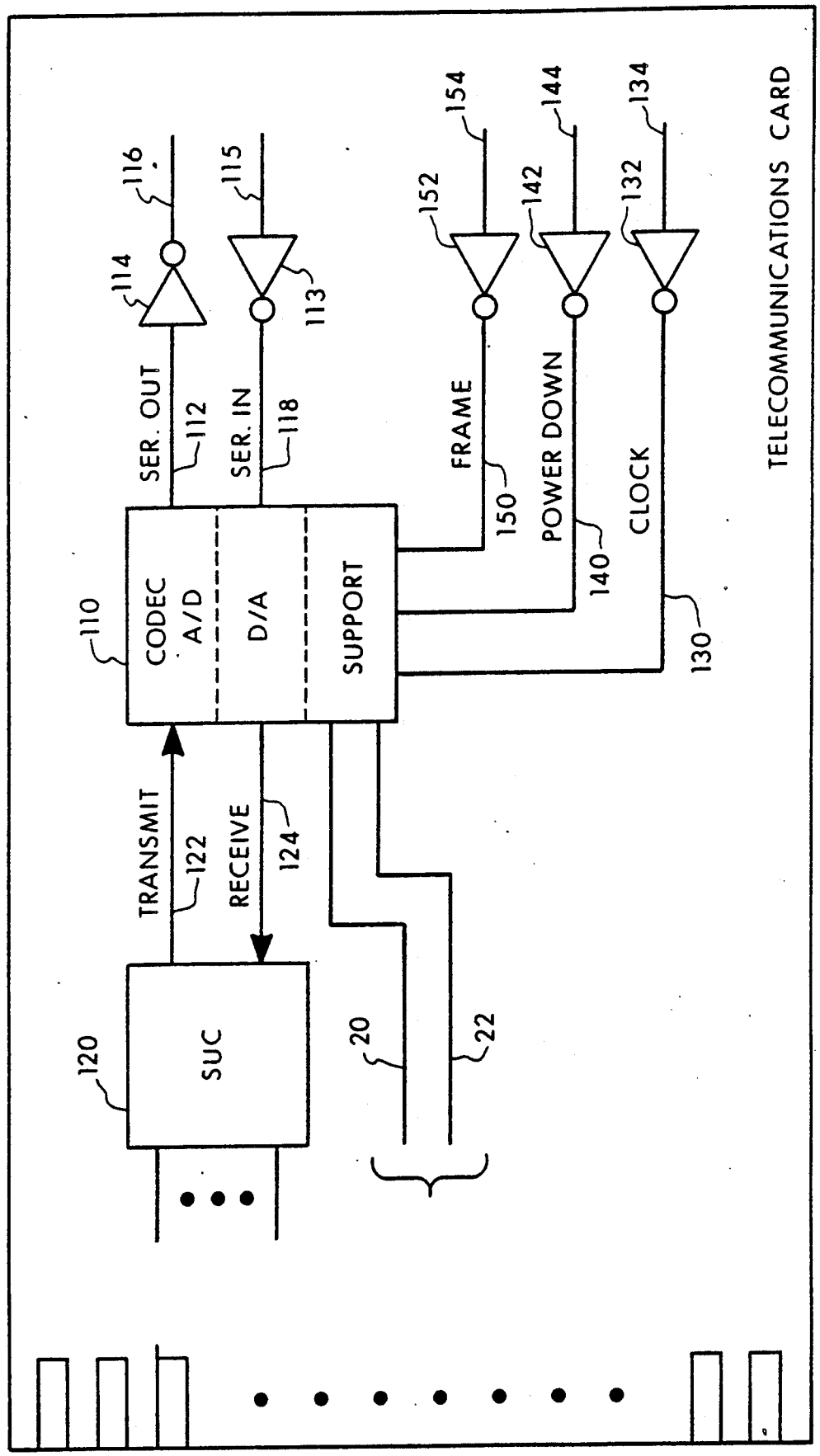
FIG. 1 is a block circuit diagram of a coder/decoder circuit located on a conventional telecommunications card.

The typical telecommunications card 100 is shown in FIG. 1 which carries a CODEC 110 and other associated telephony components such as a subscriber line interface circuit 120 (SLIC). A SLIC is an acronym for Subscriber Line Interface Circuit and refers to a class of integrated circuits used in the telecommunications industry. It is to be expressly understood that a conventional telecommunications card 100 may have a variety of other hybrid components located on the printed circuit board.

The CODEC conventionally receives an analog transmit signal 122 from the SLIC 120 and converts that signal to a digital serial output signal on line 112. As shown in FIG. 1, the digital serial output 112 is delivered to an associated component, a driver 114, for delivery over line 116 to other portions of the telecommunications circuitry. The CODEC 110 also receives a digital serial input 118 from an associated component, driver 113, which receives signals over line 115 from circuitry in the telecommunications card 100. The CODEC 110 converts the digital serial input on line 118 into an analog receive output on line 124 which is delivered into the SLIC 120.

In addition, the CODEC 110 requires digital support signals including a clock on line 130 delivered from driver 132 which receives its input 134 from circuitry on the telecommunications card 100. A power down signal on line 140 which is delivered from driver 142 which is also interconnected over line 144 to other portions of the telecommunications card and a framing pulse on line 150 from driver 152 which is interconnected to line 154 on the telecommunications card. The power down signal 140 is used to conserve power when the CODEC is not active. The clock and framing signals provide the necessary timing signals for the operation of the CODEC. Clock rates are determined by telecommunications standards—1,544 MHz for Bell T1, and 2,048 MHz for CCITT. The framing pulse serves two purposes. It determines the sampling rate for the CODEC D/A and A/D converters, and it determines the time slot assigned to the CODEC on the multi-channel PCM back plane. Its rate is always 8 kHz. These signals are synchronous resulting in 193 bits and 256 bits per frame or 24 and 32 time slots per frame (8 bits each plus one signalling bit for Bell T1) for the clock frequencies just mentioned. Leads 115, 116, 134, 144 and 154 are all connected to the PCM back plane of the telecommunications card in a conventional fashion. Power and ground signals are delivered to the CODEC 110 over lines 20 and 22.

Conventionally available CODECs 110 can include stand alone CODEC integrated circuits (those consisting of analog to digital and digital to analog converters only) or the more recently introduced "combo" chips which include signal conditioning filter functions in addition to the converters. The automated testing apparatus of the present invention is capable of testing both types of CODECs.

In the following, the comprehensive programmatically generated testing of the CODEC is possible in a manner completely independent of the downstream and upstream circuitry surrounding the device under the test. This is accomplished by electronically isolating the CODEC under test from its attendant circuitry (SLIC 120 and associated components 113, 114, 132, 142, and 152), programmatically relating the analog and digital input ports with appropriate analog waveforms or digital patterns respectively, and finally evaluating the CODEC responses by comparing digital output bit streams and analog output waveforms through expected responses. This process is repeated as many times as necessary to completely evaluate the specific CODEC under test.

Figure 2A:
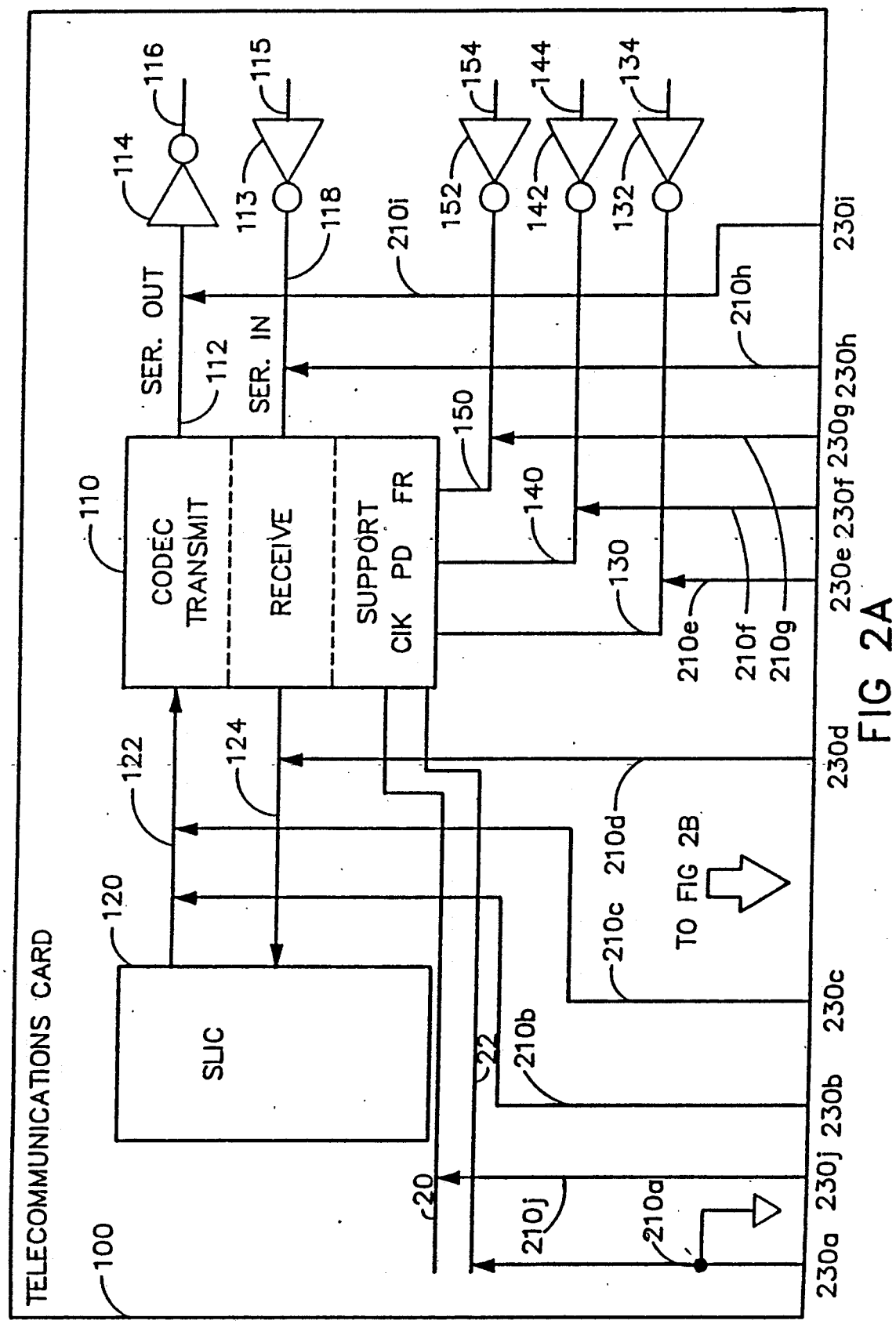
FIGS. 2a and 2b set forth the schematic circuit diagram of the in-circuit tester of the present invention selectively interconnected to the coder/decoder circuit being tested.
Figure 2B:
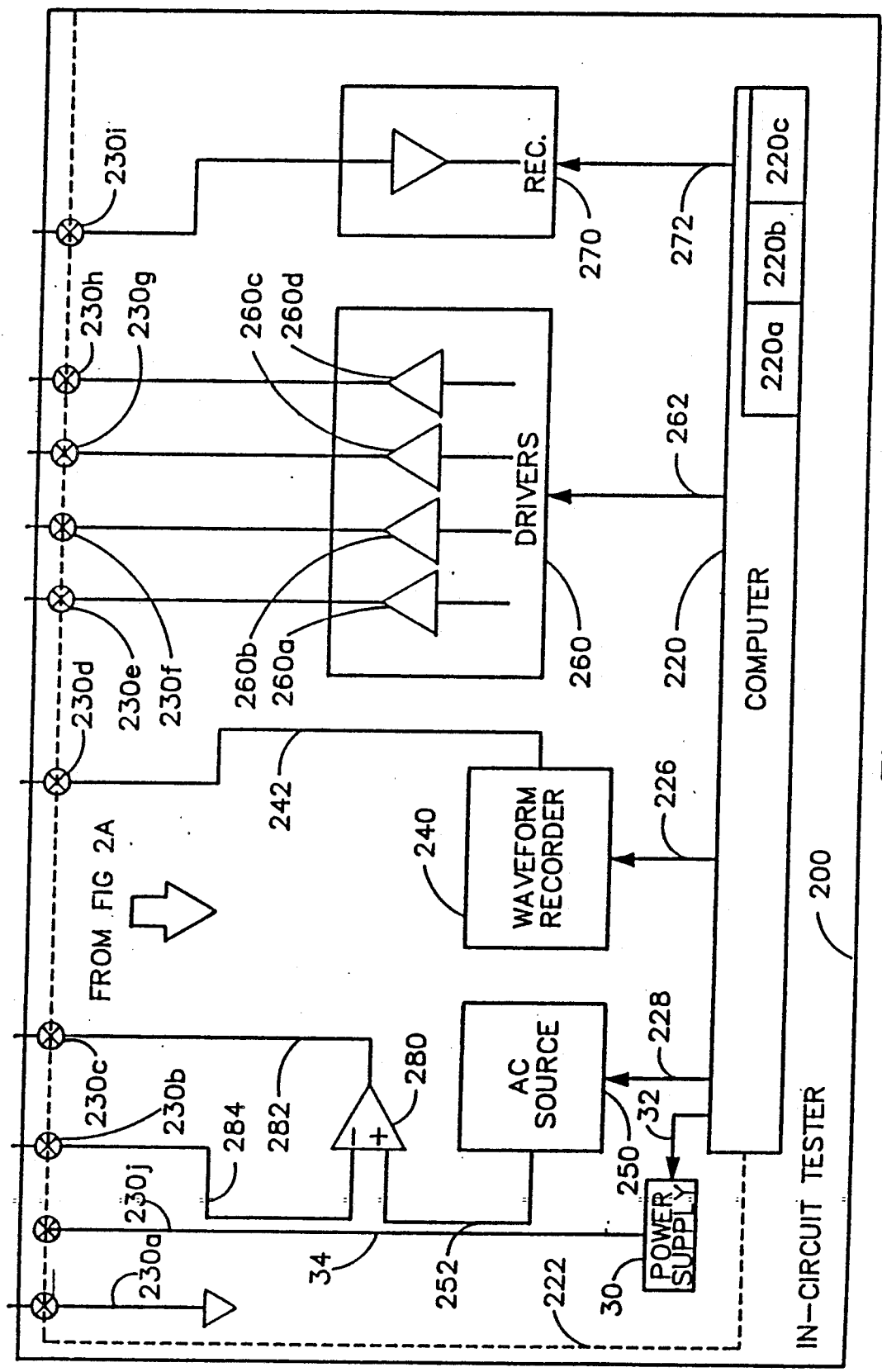

In FIGS. 2a and 2b, the configuration for the incircuit testing of the CODEC 110, under the teachings of the present invention, is set forth. The telecommunications card 100 is placed on a fixture, not shown, wherein the in-circuit tester 200 of the present invention accesses the CODEC 110 input and output pins by means of mechanical test probes 210 that engage the actual pins on the telecommunications card. As shown in FIG. 2b, the in-circuit tester 200 utilizes a computer 220 as an overall control of the present invention. The computer 220 can be actually located in the tester 200 or can be remote therefrom. Computer 220 over line 222 control relays 230 in a fashion to be described subsequently. The computer also controls a power supply 30 over lines 32, a waveform recorder 240 over line 226, an AC source 250 over line 228 and a bank of digital drivers 260 over line 262 and digital receivers 270 over lines 272. The computer 220 has an internal memory 220a for storing the program of the present invention as well as a memory portion 220b for storing "expected" signals from the CODEC 110, under test, and a memory portion 220c for storing the "actual" signals resulting from the testing of the CODEC. The power supply 30 is connected to scanning relay 230*j* over line 34 which in turn is selectively connected to the power pin 20 over probe 210*j*.

The waveform recorder 240 is selectively connected by relay 230*d* over line 242 to pin 124 and the AC source 250 is selectively connected by relay 230*c* over line 252 through an analog overdriving amplifier 280 to pin 122. Amplifier 280 has its output connected to line 282 and has its negative input connected to line 284. The four digital overdrive drivers 260 comprise driver 260*a* for driving the clock or pin 130, driver 260*b* for driving the power down on pin 140, driver 260*c* for driving the frame on pin 150 and driver 260*d* for driving the serial input 118. Finally, the digital receiver 270 is interconnected to the serial output pin 112.

The AC source 250 is an alternating current voltage source having a range of +/−10.0 volts at a minimum resolution of 3.0 mV and an accuracy of +/−0.1%. It further has a frequency range of 0.5 Hz to 20 kHz with a resolution of 0.5 Hz and an accuracy of 0.5 Hz. The analog overdriving amplifier 280 produces a minimum output current of 150 mA with a maximum output impedance of 3.0 ohms. The overdriving digital drivers 260 operate in a range of minus 3.5 to plus 5.0 volts at a minimum resolution of 5.0 mV and a current capability of +/−500 mA.

The in-circuit tester 200 communicates with the CODEC 110, under test, through the scanner relays 230 which are connected to mechanical probes 210 on a test fixture, not shown. The mechanical and electrical connections are shown in FIGS. 2*a* and 2*b* with the probes 210 engaging the selected pins of the CODEC 110, under test, and ready for the pin checks and gross functionality tests of the present invention as set forth in the following. The probes 210 physically make contact with the printed circuit pins, pads, or points for the input and output lines of the CODEC 110 on the telecommunications card 100. In this position, power can also be provided to the card.

It is to be expressly understood that to perform an in-circuit test with the telecommunications card 100 powered up, it becomes necessary to electrically isolate the CODEC 110, under test, from all surrounding circuitry and associated components. This cannot be physically done (i.e., separation of the components from the card) and must be electrically done, under the teachings of the present invention by means of guarding, digital overriding, and analog overdriving while at the same time preventing damage to the other associated components on the card. Once the CODEC 110 is isolated from all surrounding circuities, the appropriate CODEC inputs are stimulated and then measurements are made at the appropriate CODEC outputs to determine pin checks and gross functionality. This process may be repeated as many times as necessary to completely evaluate the CODEC, under test.

The electrical isolation techniques, of the present invention, cover the digital inputs such as the clock input 130, the power down input 140, the frame input 150 and the serial input 118. In addition, the transmit analog input 122 is also isolated. Measurements are then made at the digital serial output 112 and the analog receive output 124 to verify operation of the CODEC 110, under test.

Figure 3:
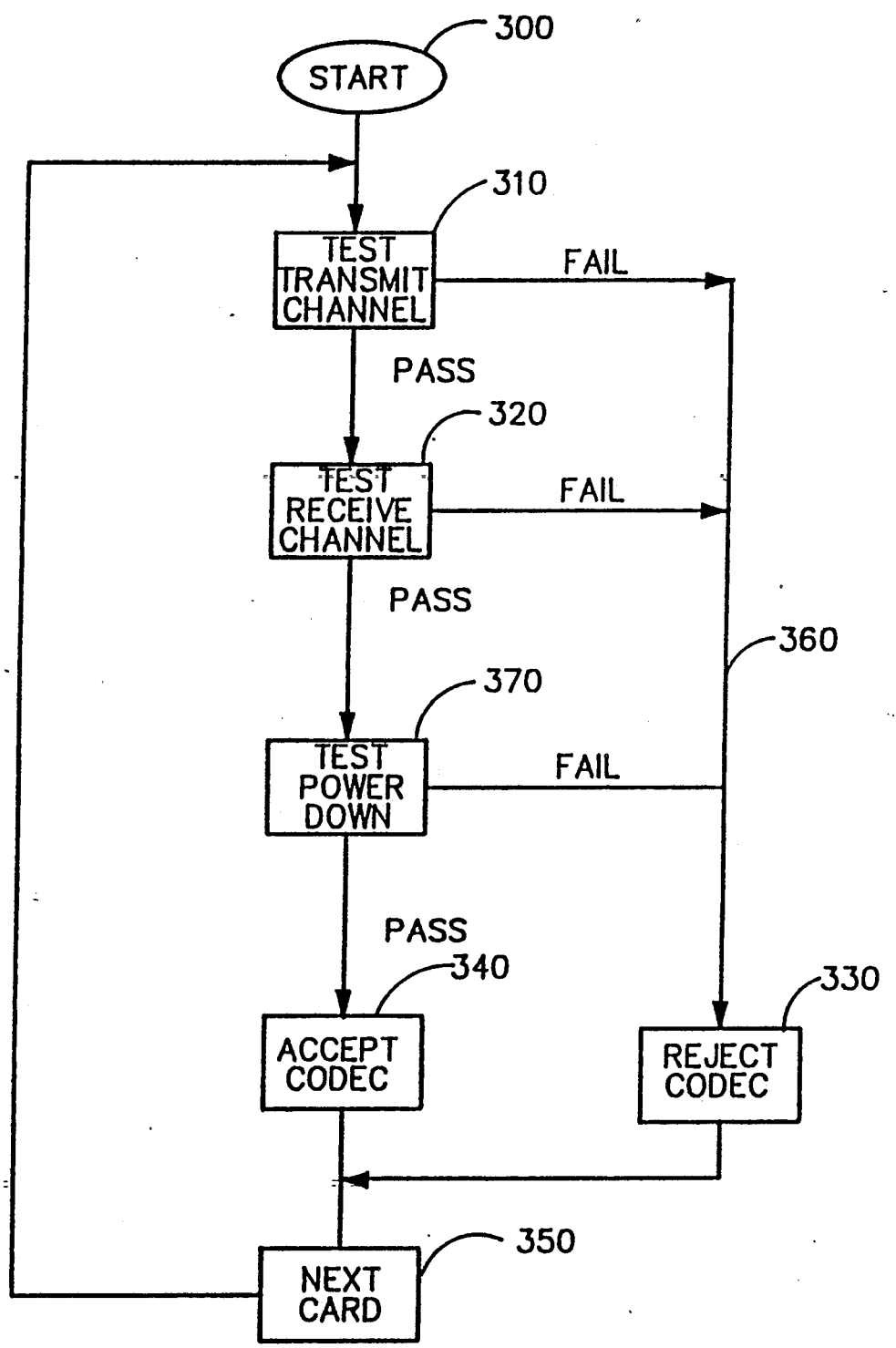
FIG. 3 is a generalized flow diagram setting forth the automated test modules of the present invention.

In FIG. 3 the overall automatic operation performing the tests of the present invention is set forth. The computer 220 is programmed in memory 220*a* to start 300 the testing process. The first card is loaded onto the fixture as shown in FIGS. 2*a* and 2*b* and the in-circuit tester causes the probes 210 to engage the pins of the CODEC 110. The system is initially reset and the computer 220 then tests 310 the transmit channel by applying an analog signal to pin 122 and sensing the serial digital output on pin 112. If the transmit channel tests out properly, then the process passes to the second test, the test 320 of the receive channel. If the transmit channel fails, it then rejects 330 the CODEC.

During the test 320 of the receive channel, digital pulses are applied to pin 118 and the analog output on pin 124 is recorded Again, if the CODEC, 110 under test, passes, the CODEC is accepted 340. However if it fails, the computer 220 rejects 330 the CODEC.

The third test 370 is the test of the power down input on pin 140. During this test, the CODEC is powered down by applying the proper power down signal to pin 140. Power is provided to pin 20 by supply 30 and the current drain on the power supply 30 is then measured by the supply and delivered to the computer 220. If the current drain is below a predetermined level, the CODEC is passed and, if not, it is failed Upon complete testing of this CODEC, the scanning relays 230 are released and a new telecommunications card is inserted at stage 350 and the tests are repeated.

It is to be expressly understood that the test of the transmit channel 310 during first time interval, the test of the receive channel 320 during a second time interval, and the test of the power down 340 during a third time interval, could occur in any desired order based upon the needs of a particular customer. In addition, it is to be expressly understood that if the CODEC 110 fails the first test (test of transmit channel 310), the remaining tests could be skipped as by line 360. Any failure in the CODEC 110 will cause the telecommunications card to fail and, therefore, the operator may either discard it or send it back for repair. In some situations, it may be desirable to complete all of the tests and keep track of the type of failures present. This may add valuable insight into the manufacturing process of the telecommunications card 100. In addition, while a new card could be mounted at stage 350, the system could be programmed to conduct other in-circuit tests on other components on the same card before proceeding to the next card.

The advantage of the in-circuit tester 200 of the present invention is that it automatically and rapidly proceeds from test to test, checks the pins and verifies gross functionality as will be discussed in the following.

1. Test Transmit Channel 310

Figure 4:
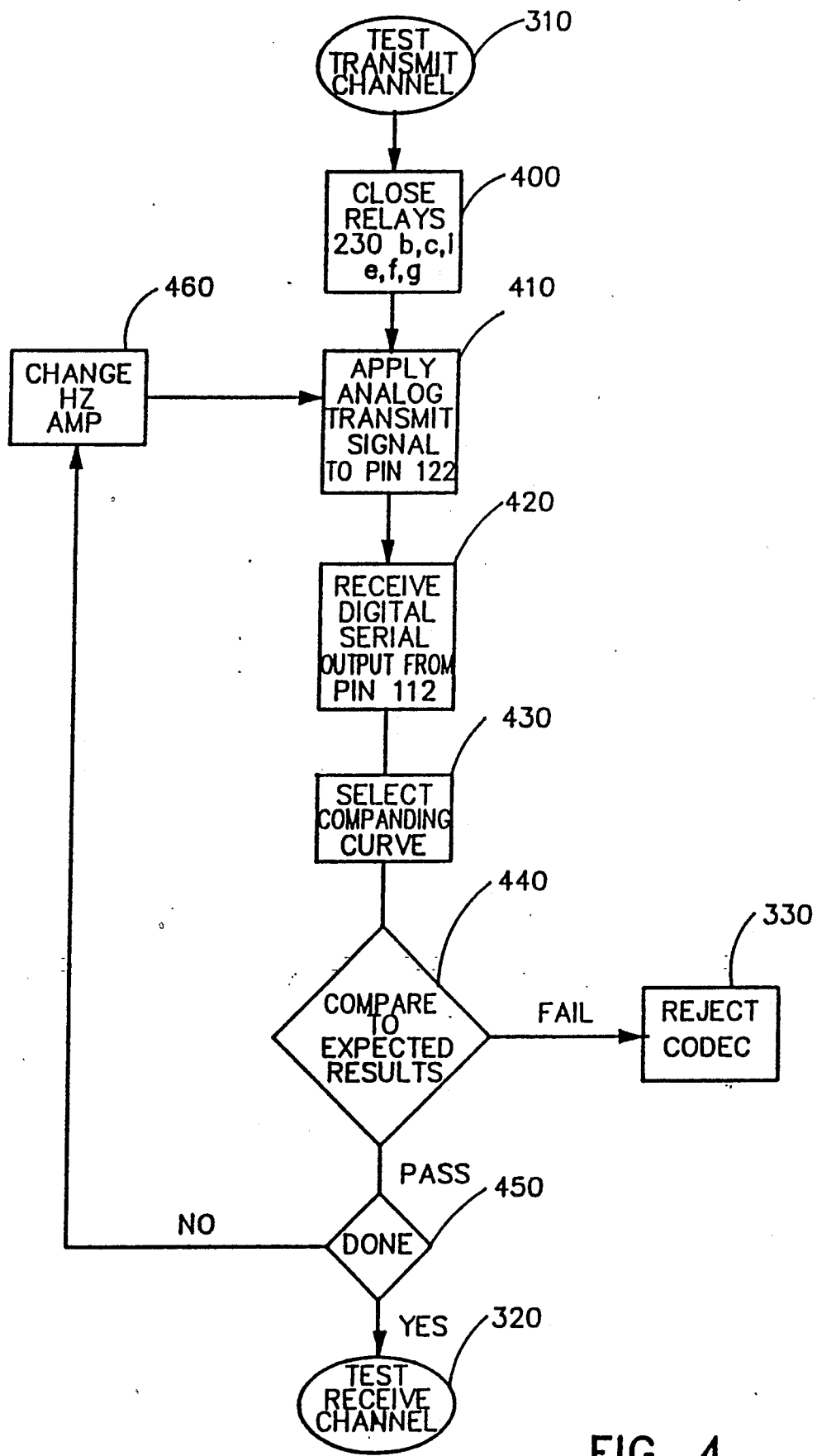
FIG. 4 sets forth the flow diagram for the module testing of the transmit channel on a coder/decoder circuit, under test.

The first automatic test performed by in-circuit tester 200 during a first interval of time is the test of the transmit channel 310. The flow diagram showing this test procedure is set forth in FIG. 4.

During the first stage 400, the computer 220 closes the scanner relays 230*b*, 230*c*, 230*e*, 230*f*, 230*g* and 230*i*. The closing of relays 230*b* and 230*c* connects the overdrive amplifier 280 to pin 122. The overdrive amplifier's output 282 through closed relay 230*c* and probe 210*c* imposes an analog waveform on pin 122 Remote sensing is provided over probe 210*b* back into the negative input of the overdrive amplifier 280 over lead 284. The remote sensing assures the accuracy of the applied voltage and effectively cancels out level shifts. This functions to provide the desired waveforms to the transmit pin 122 At this point, the overdrive amplifier 280 provides an electrical isolation of the transmit analog input from SLIC 120 and stimulates the pin 122 with an appropriate analog test signal. The closing of relay 230*i* enables the serial output pin 112 to be connected to the digital receiver 270.

During stage 410, the computer 220 applies the analog transmit signal to pin 122. In addition, the computer is activating (a) driver 260*a* to provide the necessary clock signals to pin 134, (b) driver 260*b* to provide a power up signal to pin 140, and (c) driver 260*c* to provide the necessary frame signals to pin 150. After a period of time in which the CODEC processes the analog input and the inputs on pins 130, 140 and 150, the computer in stage 420 receives the serial digital output on pin 112 in the digital receiver 270. In stage 430 the computer selects the appropriate companding curve for the specific CODEC under test. The comparison software resident in the computer 220 must accurately reflect the appropriate companding curve as implemented in the specific CODEC 110 under test for proper comparison to expected response.

In stage 440, the computer compares the digital results received in the digital receiver 270 with the expected results and if they are outside the range of the expected results, the computer 220 rejects the CODEC in stage 330. If it passes then stage 450 is entered to ascertain whether or not the computer is done.

For example, if the AC source 250 applies 410 a 3 volt, peak-to-peak, 2 kHz sine wave to pin 122 by means of the unity gain overdrive amplifier 280, the digital signal corresponding to the input is recorded 420 from pin 112 in the waveform recorder and then stored in memory 220*c* of computer 220. By means of digital signal processing software included in memory 220*b*, the analog signal characteristics represented by the received digital pattern is compared 440 to the expected response of 3 volts, peak-to-peak +/−10%. If the received response is within the +/−10% window, the CODEC 110 passes. If not, it fails.

Under the teachings of the present invention, the amplitude and the frequency of the analog signal can be changed in stage 460 as many times as is necessary to fully evaluate the CODEC 110 under test. For example, the input analog frequency can be varied in order to evaluate the functionality of filters contained within the CODEC or the input analog amplitude can be varied in order to evaluate the appropriate companding response curve.

B. Test of Receive Channel 320

Figure 5:
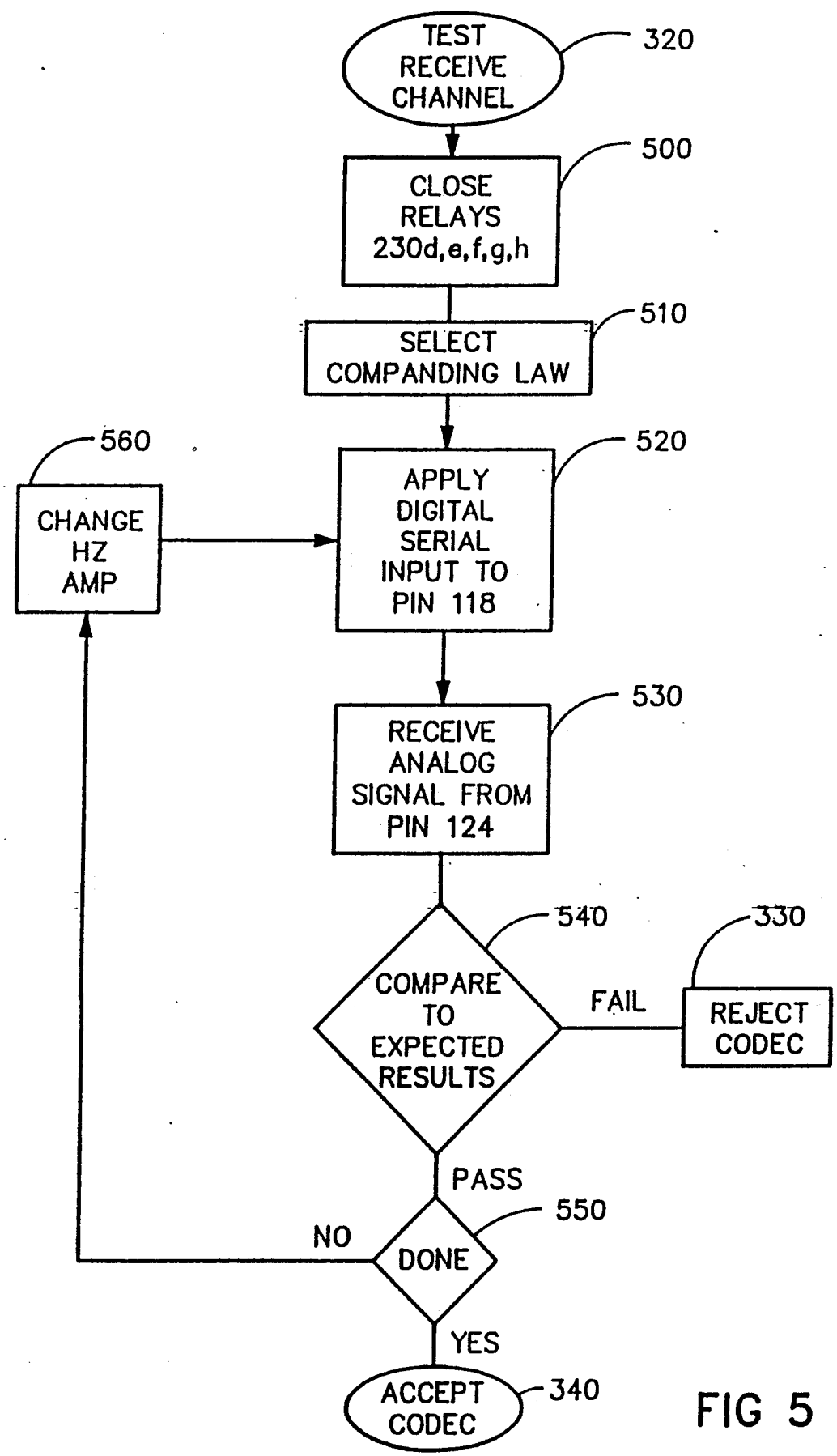
FIG. 5 sets forth the flow diagram for the module testing of the receive channel on a coder/decoder circuit, under test.

The test of the receive channel during a second time interval is shown in FIG. 5 is essentially the reverse of the above test.

In stage 500, the computer closes scanning relays 230*d, e, f, g* and *h*. This interconnects the waveform recorder 240 to the receive pin 124 and the drivers 260 to the support pins 130, 140, and 150 onto the serial input on pin 118. The computer then selects 510 the appropriate companding law and applies 520 a digital serial input to pin 118. This is accomplished by means of driver 260*d* which is a digital overdriver and which must overdrive the output of associated component 113 on pin 118. Driver 260 provides a high current digital signal in order to electrically isolate the input 118 from the associated component's output 113. The use of digital overdriving permits the application of this signal directly at the CODEC input 118 and independently of the other digital circuitry on the board under test.

An area of potential concern with respect to the associated components 113, 132, 142 and 152 in performing digital overdriving is that device damage can result. However, the in-circuit tester 200 of the present invention is designed so as to permit rapid completion of the test process and in conjunction with careful test set up, a test can be generated which is well within the overdrive tolerances of the associated components.

After a suitable time delay, to allow the CODEC 110 to process incoming digital signals, the waveform recorder 240 records 530 the analog signal output on pin 124. The computer then, in stage 540 compares the received analog signal with the expected results and if the received signal fails, the CODEC is rejected in stage 330. However, if it passes then the system enters stage 550 to ascertain whether it is done.

The generation of the digital serial input in stage 520 is complex and must be generated in strict accordance with the definitions of digital PCM interface. Test software must be able to accurately reflect the companding curve implemented on the specific CODEC under test. As before in the test 310 of the transmit channel, the computer 220 activates (a) driver 260*a* to provide the necessary clock signals to pin 134, (b) driver 260*b* to provide a power up signal to pin 140, and (c) driver 260*c* to provide the necessary frame signals to pin 150.

For example, applying 520 a digital pattern to pin 118 of the CODEC which represents a 3 volt, peak-to-peak, 2 kHz analog signal according to the A-law companding curve produces an analog output on pin 124. This analog output is recorded 530 in waveform recorder 240 and stored in memory 220*c*. The computer 220 then compares 540 the recorded analog signal with the expected response of 3 volts, peak-to-peak +/−10% and if the results are within the 10% window, the CODEC passes and if not, it fails.

The application of the digital input in stage 520 and the measurement in stages 530 and 540 of the resulting analog signal can be repeated as many times as necessary to fully evaluate the CODEC 110 under test. For example, in stage 560 the frequency digital codes applied at pin 118 can be changed so as to vary the resulting frequency of analog output. This is useful for evaluating the functionality of filters contained within the CODEC 110. In addition, different digital codes can be used on pin 118 to vary the resulting analog amplitude. This is useful in evaluating the companding response curve of the particular CODEC 110 under test.

C. Test of Power Down

Figure 6:
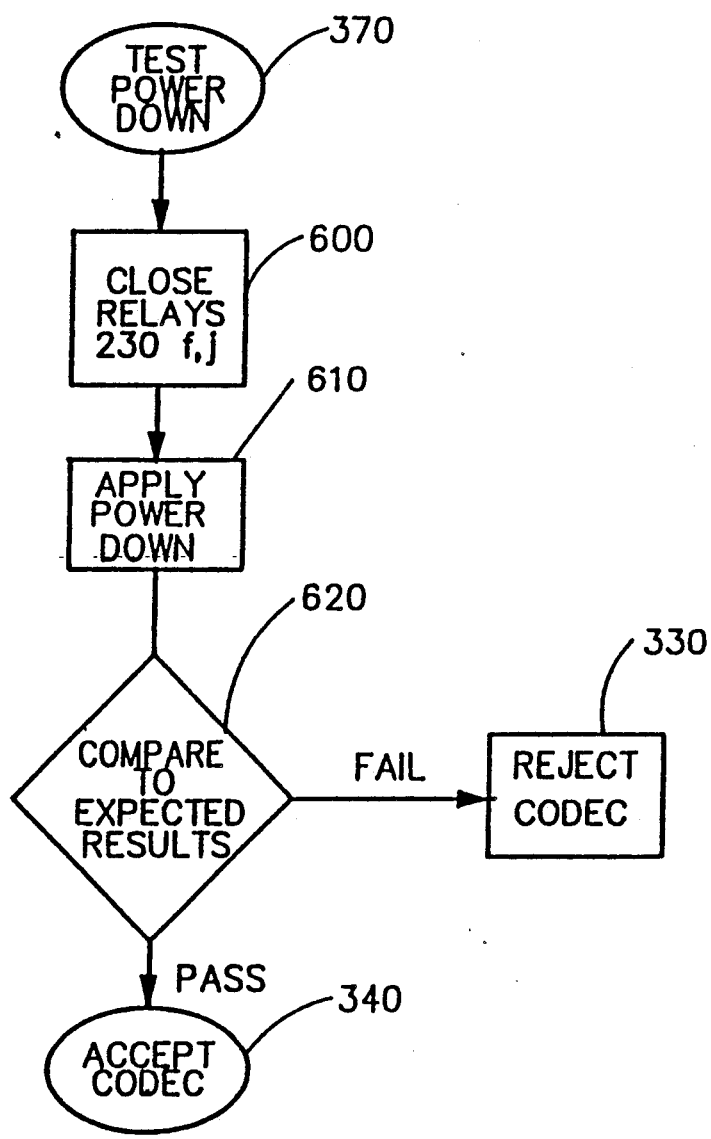
FIG. 6 sets forth the flow diagram for the module testing of the power down capabilities of a coder/decoder circuit, under test.

The testing of the power down during a third time interval is shown in FIG. 6.

The computer opens the scanning relays from the prior test and then closes 600 relays 230 *f* and *j*. This connects driver 260*b* to the input pin 140 for power down and the power supply 30 over line 34 to power pin 20. In the prior two tests 310 and 320, this latter connection to the power supply 30 was also made although not shown.

The computer 220 then applies 610 a signal to power down CODEC 110 and then, after a settling time, measures the current drain from power supply 30 over lines 32. The computer then compares 620 the measured drain with an expected value and if the measured current is within +/−10% of the expected, the CODEC 110 passes. If not, it fails.

This completes the automated CODEC testing procedure of the present invention. In a typical testing of a CODEC, the present invention can proceed, automatically, and provide several orders of magnitude of speed improvement over conventional CODEC testing approaches. After completion, the computer opens all relays. The card can now be removed and the next CODEC inserted for testing or the system can proceed with tests of other components on the same card as set forth in the above related applications It is to be expressly understood that while a preferred order of testing is set for in FIGS. 3-6, these procedures may be changed in the order of processing, truncated into fewer steps in order to increase throughput or further partitioned into more steps in order to cover a specific requirement. The present invention therefore provides a unique means and method of programmatically generating in-circuit pin checks and gross functionality tests of CODECs such as those found on a telecommunications card. The present invention, therefore, provides a method of quality control in the manufacture of printed circuit boards containing these hybrid circuits.

The foregoing description of the invention has been presented for purposes of illustration and description. It is not intended to be exhaustive or to limit the invention to precisely the form disclosed, as other modifications and variations may be possible in light of the above teachings. The embodiment was chosen and described in order to best explain the principles of the invention in its practical application to thereby enable others skilled in the art to best utilize the invention and various embodiments and various modifications as are suited to particular use contemplated. It is intended that the appended claims be construed to include other alternative embodiments of the invention except as limited by the prior art.

I claim:

1. An automated apparatus for in-circuit testing of a coder/decoder circuit mounted on a telecommunications card, said coder/decoder circuit being interconnected with other associated components on said card, said coder/decoder circuit being capable of generating analog receive and digital serial out signals in response to receiving digital serial in, analog transmit, and digital frame, power down, and clock signals, said automated apparatus comprising:
    means connected to said telecommunications card for electrically isolating said coder/decoder circuit from said other associated components on said card,
    means connected to said electrical isolation means for selectively causing said coder/decoder circuit to generate said analog receive and digital serial out signals by applying test (a) analog transmit (b) digital serial in, (c) frame, (d) power down, and (e) clock signals to said coder/decoder circuit which overdrive any analog or digital signals present on said telecommunications card,
    means in said selective causing means for comparing each selectively generated analog receive and digital serial out signals to expected values, and
    means in said selective causing means for issuing a fail signal when any one of said selectively generated signals does not correspond in a predetermined range to said expected values.

2. An automated apparatus for in-circuit testing of a coder/decoder circuit mounted on a telecommunications card, said coder/decoder circuit being interconnected with other associated components on said card, said coder/decoder circuit having transmit and receive pins, serial in and serial out pins and frame, power down, power and clock pins, said automated apparatus comprising:
    first means automatically connecting to said transmit, frame, power down, clock, and serial out pins for applying, during a first time interval, at least one analog AC voltage signal on said transmit pin, said first applying means further recording digital signals on said serial out pin,
    second means automatically connecting to said serial in, frame, power down, clock and receive pins for applying, during a second time interval, at least one digital signal to said serial in pin, said second applying means further recording analog signals on said receive pin,
    third means automatically connecting to said power down and power pins for applying, during a third time interval, a power down signal to said power down pin, said third applying means receiving a current drain signal on said power pin, and
    means receptive of said digital signals on said serial out pin during said first time interval, said recorded analog signals on said receive pin during said second time interval, and said current drain signal on power pin during said third time interval for comparing each of said received and recorded signals to expected signals, said comparing means issuing fail signals when any one of said received and recorded signals falls outside a predetermined range of said expected signals.

3. The automated apparatus of claim 2 further comprising means in said first applying means for generating said analog AC voltage signal, said generating means being capable of generating an AC voltage in the range of $+/-10.0$ volts at a minimum resolution of 3.0 mV with an accuracy of $+/-0.1\%$ and in a frequency range of 0.5 Hz to 20 KHz with a resolution of 0.5 Hz and an accuracy of $+/-0.5\%$.

4. An automated apparatus for in-circuit testing of a coder/decoder circuit mounted on a telecommunications card, said coder/decoder circuit being interconnected with other associated components on said card, said coder/decoder circuit having transmit and receive pins, serial in and serial out pins, and frame, and clock pins, said automated apparatus comprising
    first means automatically connecting to said transmit, frame, clock, and serial out pins for applying, during a first time interval, at least one analog AC voltage signal on said transmit pin by electrically overdriving any analog signal on said transmit pin, said first applying means further recording digital signals on said serial out pin,
    second means automatically connecting to said serial in, frame, clock and receive pins for applying, during a second time interval, at least one digital signal to said serial in pin by electrically overdriving any digital signal from said serial in pin, said second applying means further recording analog signals on said receive pin,
    means receptive of said digital signals on said serial out pin during said first time interval and said recorded analog signals from said receive pin during said second time interval for comparing each of said received and recorded signals to expected signals, said comparing means issuing fail signals when any one of said received and recorded signals falls outside a predetermined range of said expected signals.

5. The automated apparatus of claim 4 further comprising means in said first applying means for generating said analog AC voltage signal, said generating means being capable of generating an AC voltage in the range of +/−10.0 volts at a minimum resolution of 3.0 mV with an accuracy of +/−0.1% and in a frequency range of 0.5 Hz to 20 KHz with a resolution of 0.5 Hz and an accuracy of +/−0.5%.

6. The automated apparatus of claim 4 further comprising means in said first applying means and receptive of said at least one analog AC voltage signal for amplifying said analog AC voltage signal in order to electrically overdrive said analog AC voltage signal.

7. The automated apparatus of claim 6 wherein said amplifying means produces a minimum output current of 150 mA within a maximum output impedance of 3.0 ohms.

8. The automated apparatus of claim 4 wherein said digital overdriving means operates in a range of −3.5 to +5.0 volts at a minimum resolution of 5.0 mV and a current capability of +/−500 mA.

9. A method for in-circuit testing of a coder/decoder circuit mounted on a telecommunications card, said coder/decoder circuit being interconnected with other associated components on said card, said coder/decoder circuit being capable of generating analog receive, and digital serial out in response to receiving digital serial in, analog transmit, and digital frame, power down, and clock signals, said method comprising the steps of:

electrically isolating the coder/decoder circuit from said other associated components on said card, selectively causing the coder/decoder circuit to generate the analog receive and digital serial out by applying testing signals to the coder/decoder circuit which overdrive any analog or digital signals present on said telecommunications card, comparing each selectively generated analog receive and digital serial out signals to expected values, and issuing a fail signal when any one of the selectively generated signals does not correspond to said expected value.

10. A method for the automatic in-circuit testing of a coder/decoder circuit mounted on a telecommunications card, said coder/decoder circuit being interconnected with other associated components on said card, said coder/decoder circuit having transmit and receive pins, serial in and serial out pins, and frame, power down, power, and clock pins said method comprising the automatic steps of:

during a first time interval:
(a) applying at least one analog AC voltage signal to said transmit pin, and
(b) recording the resulting digital signals on said serial out pin, during a second time interval:
(a) applying at least one digital signal to said serial in pin, and
(b) recording the resulting analog signals on said receive pin, during a third time interval
(a) applying a power down signal to said power down pin, and
(b) receiving the resulting current drain from said power pin, comparing each of the recorded digital signals from said serial out pin, the recorded analog signal from said receive pin, and the current drain from said power pin to expected signals, and issuing fail signals when any one of the received and recorded signals falls outside a predetermined range of said expected signals.

11. A method for the automatic in-circuit testing of a coder/decoder circuit mounted on a telecommunications card, said coder/decoder circuit being interconnected with other associated components on said card, said coder/decoder circuit having transmit and receive pins, serial in and serial out pins, and frame, and clock pins, said method comprising the automatic steps of:

during a first time interval:
(a) applying at least one analog AC voltage signal to electrically overdrive any analog signal on said transmit pin, and
(b) recording the resulting digital signals on said serial out pin, during a second time interval
(a) applying at least one digital signal to electrically overdrive any digital signal on said receive pin, and
(b) recording the resulting analog signals on said receive pin, comparing each of the recorded signals from said serial out pin and from said receive pin to expected signals, and issuing fail signals when any one of the received and recorded signals falls outside a predetermined range of said expected signals.

* * * * *